United States Patent
Yearsley et al.

(10) Patent No.: US 7,342,984 B1
(45) Date of Patent: *Mar. 11, 2008

(54) COUNTING CLOCK CYCLES OVER THE DURATION OF A FIRST CHARACTER AND USING A REMAINDER VALUE TO DETERMINE WHEN TO SAMPLE A BIT OF A SECOND CHARACTER

(75) Inventors: Gyle D. Yearsley, Boise, ID (US); Joshua J. Nekl, Boise, ID (US)

(73) Assignee: ZiLOG, Inc., San Jose, CA (US)

( * ) Notice: Subject to any disclaimer, the term of this patent is extended or adjusted under 35 U.S.C. 154(b) by 797 days.

This patent is subject to a terminal disclaimer.

(21) Appl. No.: 10/407,390

(22) Filed: Apr. 3, 2003

(51) Int. Cl.
*H04L 7/00* (2006.01)
*H04B 17/00* (2006.01)

(52) U.S. Cl. .......................... 375/354; 375/225

(58) Field of Classification Search ................ 375/225, 375/295, 316, 219, 340, 360, 369, 370, 354–357, 375/37; 713/400
See application file for complete search history.

(56) References Cited

U.S. PATENT DOCUMENTS

| | | | |
|---|---|---|---|
| 3,700,808 A | * | 10/1972 | Lowery et al. ............ 178/69 A |
| 4,058,430 A | | 11/1977 | Suntola et al. |
| 4,415,275 A | | 11/1983 | Dietrich |
| 4,578,798 A | * | 3/1986 | Divjak et al. ................ 375/272 |
| 4,761,269 A | | 8/1988 | Conger et al. |
| 4,834,831 A | | 5/1989 | Nishizawa et al. |
| 4,975,252 A | | 12/1990 | Nishizawa et al. |
| 4,993,357 A | | 2/1991 | Scholz |
| 5,027,746 A | | 7/1991 | Frijlink |
| 5,173,327 A | | 12/1992 | Sandhu et al. |
| 5,178,681 A | | 1/1993 | Moore et al. |
| 5,225,366 A | | 7/1993 | Yoder |
| 5,261,959 A | | 11/1993 | Gasworth |
| 5,281,274 A | | 1/1994 | Yoder |
| 5,294,286 A | | 3/1994 | Nishizawa et al. |
| 5,338,362 A | | 8/1994 | Imahashi |
| 5,441,703 A | | 8/1995 | Jurgensen |
| 5,443,647 A | | 8/1995 | Aucoin et al. |
| 5,674,786 A | | 10/1997 | Turner et al. |
| 5,711,811 A | | 1/1998 | Suntola et al. |
| 5,730,802 A | | 3/1998 | Ishizumi et al. |
| 5,796,116 A | | 8/1998 | Nakata et al. |
| 5,835,677 A | | 11/1998 | Li et al. |
| 5,879,459 A | | 3/1999 | Gadgil et al. |
| 5,972,430 A | | 10/1999 | DiMeo, Jr. et al. |

(Continued)

FOREIGN PATENT DOCUMENTS

EP 0 497 267 8/1992

(Continued)

*Primary Examiner*—Khai Tran
(74) *Attorney, Agent, or Firm*—Imperium Patent Works; T. Lester Wallace; Darien K. Wallace

(57) ABSTRACT

In an auto baud system and method, the baud rates between two communicating devices are synchronized by timing the transmission of a plurality of bits by counting the cycles of a reference clock. The number of cycles counted is then divided by the number of bits counted over and any remaining cycles are distributed evenly across the data being transmitted or received. The interface of the circuit is preferably implemented as a single pin, open drain interface which can be connected to an RS-232 communications link using external hardware.

20 Claims, 2 Drawing Sheets

U.S. PATENT DOCUMENTS

| | | | |
|---|---|---|---|
| 6,042,652 A | 3/2000 | Hyun et al. | |
| 6,071,572 A | 6/2000 | Mosely et al. | |
| 6,072,534 A * | 6/2000 | Dell'ova et al. | 348/524 |
| 6,139,700 A | 10/2000 | Kang et al. | |
| 6,163,586 A * | 12/2000 | Hongbin Hao et al. | 375/377 |
| 6,174,377 B1 | 1/2001 | Doering et al. | |
| 6,183,563 B1 | 2/2001 | Choi et al. | |
| 6,197,683 B1 | 3/2001 | Kang et al. | |
| 6,231,672 B1 | 5/2001 | Choi et al. | |
| 6,302,965 B1 | 10/2001 | Umotoy et al. | |
| 6,306,216 B1 | 10/2001 | Kim et al. | |
| 6,447,607 B2 | 9/2002 | Soininen et al. | |
| 6,478,872 B1 | 11/2002 | Chae et al. | |
| 6,481,945 B1 | 11/2002 | Hasper et al. | |
| 6,551,406 B2 | 4/2003 | Kilpi | |
| 6,572,705 B1 | 6/2003 | Suntola et al. | |
| 6,578,287 B2 | 6/2003 | Aswad | |
| 6,579,372 B2 | 6/2003 | Park | |
| 6,593,484 B2 | 7/2003 | Yasuhara et al. | |
| 6,630,030 B1 | 10/2003 | Suntola et al. | |
| 6,632,747 B2 | 10/2003 | Niimi et al. | |
| 6,660,126 B2 | 12/2003 | Nguyen et al. | |
| 6,716,287 B1 | 4/2004 | Santiago et al. | |
| 6,718,126 B2 | 4/2004 | Lei | |
| 6,734,020 B2 | 5/2004 | Lu et al. | |
| 6,772,072 B2 | 8/2004 | Ganguli et al. | |
| 6,773,507 B2 | 8/2004 | Jallepally et al. | |
| 6,777,352 B2 | 8/2004 | Tepman et al. | |
| 6,778,762 B1 | 8/2004 | Shareef et al. | |
| 6,818,094 B2 | 11/2004 | Yudovsky | |
| 6,821,563 B2 | 11/2004 | Yudovsky | |
| 6,866,746 B2 | 3/2005 | Lei et al. | |
| 6,868,859 B2 | 3/2005 | Yudovsky | |
| 6,881,437 B2 | 4/2005 | Ivanov et al. | |
| 6,902,624 B2 | 6/2005 | Seidel et al. | |
| 6,921,062 B2 | 7/2005 | Gregg et al. | |
| 6,970,525 B1 * | 11/2005 | Kljajic et al. | 375/354 |
| 2001/0011526 A1 | 8/2001 | Doering et al. | |
| 2001/0013312 A1 | 8/2001 | Soininen et al. | |
| 2001/0014371 A1 | 8/2001 | Klipl | |
| 2001/0029092 A1 | 10/2001 | Park et al. | |
| 2001/0042523 A1 | 11/2001 | Kesala | |
| 2001/0042799 A1 | 11/2001 | Kim et al. | |
| 2001/0054377 A1 | 12/2001 | Lindfors et al. | |
| 2002/0000196 A1 | 1/2002 | Park | |
| 2002/0009544 A1 | 1/2002 | McFeely et al. | |
| 2002/0009896 A1 | 1/2002 | Sandhu et al. | |
| 2002/0017242 A1 | 2/2002 | Hamaguchi et al. | |
| 2002/0041931 A1 | 4/2002 | Suntola et al. | |
| 2002/0066411 A1 | 6/2002 | Chiang et al. | |
| 2002/0073924 A1 | 6/2002 | Chiang et al. | |
| 2002/0076481 A1 | 6/2002 | Chiang et al. | |
| 2002/0076507 A1 | 6/2002 | Chiang et al. | |
| 2002/0076508 A1 | 6/2002 | Chiang et al. | |
| 2002/0086106 A1 | 7/2002 | Park et al. | |
| 2002/0092471 A1 | 7/2002 | Kang et al. | |
| 2002/0104481 A1 | 8/2002 | Chiang et al. | |
| 2002/0108570 A1 | 8/2002 | Lindfors et al. | |
| 2002/0110991 A1 | 8/2002 | Li | |
| 2002/0114409 A1 * | 8/2002 | Shingaki | 375/340 |
| 2002/0115886 A1 | 8/2002 | Yasuhara et al. | |
| 2002/0121241 A1 | 9/2002 | Nguyen et al. | |
| 2002/0121342 A1 | 9/2002 | Lu et al. | |
| 2002/0127745 A1 | 9/2002 | Lu et al. | |
| 2002/0134307 A1 | 9/2002 | Choi | |
| 2002/0144655 A1 | 10/2002 | Chiang et al. | |
| 2002/0144657 A1 | 10/2002 | Chiang et al. | |
| 2002/0146511 A1 | 10/2002 | Chiang et al. | |
| 2002/0197883 A1 | 12/2002 | Niimi et al. | |
| 2003/0004723 A1 | 1/2003 | Chihara | |
| 2003/0010451 A1 | 1/2003 | Tzu et al. | |
| 2003/0017697 A1 | 1/2003 | Choi et al. | |
| 2003/0022338 A1 | 1/2003 | Ruben et al. | |
| 2003/0042630 A1 | 3/2003 | Babcoke et al. | |
| 2003/0053799 A1 | 3/2003 | Lei | |
| 2003/0057527 A1 | 3/2003 | Chung et al. | |
| 2003/0072913 A1 | 4/2003 | Chou et al. | |
| 2003/0075273 A1 | 4/2003 | Kilpela et al. | |
| 2003/0075925 A1 | 4/2003 | Lindfors et al. | |
| 2003/0079686 A1 | 5/2003 | Chen et al. | |
| 2003/0089308 A1 | 5/2003 | Raajimakers | |
| 2003/0101927 A1 | 6/2003 | Raaijmakers | |
| 2003/0101938 A1 | 6/2003 | Ronsse et al. | |
| 2003/0113187 A1 | 6/2003 | Lei et al. | |
| 2003/0116087 A1 | 6/2003 | Nguyen et al. | |
| 2003/0121469 A1 | 7/2003 | Lindfors et al. | |
| 2003/0121608 A1 | 7/2003 | Chen et al. | |
| 2003/0140854 A1 | 7/2003 | Kilpi | |
| 2003/0143328 A1 | 7/2003 | Chen et al. | |
| 2003/0143747 A1 | 7/2003 | Bondestam et al. | |
| 2003/0172672 A1 | 9/2003 | Thakur et al. | |
| 2003/0194493 A1 | 10/2003 | Chang et al. | |
| 2003/0198754 A1 | 10/2003 | Xi et al. | |
| 2003/0213560 A1 | 11/2003 | Wang et al. | |
| 2003/0216981 A1 | 11/2003 | Tillman | |
| 2003/0221780 A1 | 12/2003 | Lei et al. | |
| 2003/0224107 A1 | 12/2003 | Lindfors et al. | |
| 2003/0225953 A1 * | 12/2003 | Ho | 710/305 |
| 2004/0011404 A1 | 1/2004 | Ku et al. | |
| 2004/0011504 A1 | 1/2004 | Ku et al. | |
| 2004/0013577 A1 | 1/2004 | Ganguil et al. | |
| 2004/0014320 A1 | 1/2004 | Chen et al. | |
| 2004/0015300 A1 | 1/2004 | Ganguli et al. | |
| 2004/0016404 A1 | 1/2004 | Gregg et al. | |
| 2004/0025370 A1 | 2/2004 | Guenther et al. | |
| 2004/0065255 A1 | 4/2004 | Yang et al. | |
| 2004/0069227 A1 | 4/2004 | Ku et al. | |
| 2004/0071897 A1 | 4/2004 | Verplancken et al. | |
| 2004/0144308 A1 | 7/2004 | Yudovsky | |
| 2004/0144311 A1 | 7/2004 | Chen et al. | |
| 2004/0203254 A1 | 10/2004 | Conley, Jr. et al. | |
| 2004/0219784 A1 | 11/2004 | Kang et al. | |
| 2004/0224506 A1 | 11/2004 | Choi et al. | |
| 2005/0059240 A1 | 3/2005 | Choi et al. | |
| 2005/0064207 A1 | 3/2005 | Senzaki et al. | |
| 2005/0070126 A1 | 3/2005 | Senzaki | |
| 2005/0095859 A1 | 5/2005 | Chen et al. | |
| 2005/0104142 A1 | 5/2005 | Narayanan et al. | |
| 2005/0153571 A1 | 7/2005 | Senzaki | |
| 2005/0233156 A1 | 10/2005 | Senzaki et al. | |
| 2005/0255243 A1 | 11/2005 | Senzaki | |

FOREIGN PATENT DOCUMENTS

| | | |
|---|---|---|
| JP | 58-098917 | 6/1983 |
| JP | 04-291916 | 10/1992 |
| JP | 05-047666 | 2/1993 |
| JP | 05-206036 | 8/1993 |
| JP | 05-234899 | 9/1993 |
| JP | 05-270997 | 10/1993 |
| JP | 06-224138 | 8/1994 |
| JP | 2000-212752 | 8/2000 |
| JP | 2000-319772 | 11/2000 |
| JP | 2001-020075 | 1/2001 |
| WO | WO 96/17107 | 6/1996 |
| WO | WO 99/01595 | 1/1999 |
| WO | WO 99/65064 | 12/1999 |
| WO | WO 00/79576 | 12/2000 |
| WO | WO 01/36702 | 5/2001 |
| WO | WO 02/08488 | 1/2002 |
| WO | WO 02/45871 | 6/2002 |
| WO | WO 03/23835 | 3/2003 |

* cited by examiner

COUNTING CLOCK CYCLES OVER THE DURATION OF A FIRST CHARACTER AND USING A REMAINDER VALUE TO DETERMINE WHEN TO SAMPLE A BIT OF A SECOND CHARACTER

CROSS-REFERENCE TO RELATED APPLICATIONS

The present application claims the benefit under 35 USC § 120 from U.S. patent application Ser. No. 10/284,600, now U.S. Pat. No. 7,116,739, filed Oct. 31, 2002. The subject matter of U.S. application Ser. No. 10/284,600 is incorporated herein by reference.

CROSS-REFERENCE TO COMPACT DISC APPENDIX

Compact Disc Appendix, which is a part of the present disclosure, is one recordable Compact Disc (CD-R) containing information that is part of the disclosure of the present patent document. The Compact Disc contains hardware description in Verilog of a transmitter/receiver module circuit. The transmitter/receiver module circuit carries out a method in accordance with one specific embodiment of the present invention. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

FIELD OF THE INVENTION

The invention relates to a single pin communication interface and a method of detecting the baud rate for an asynchronous communication link.

BACKGROUND OF THE INVENTION

As technology develops, semiconductor devices are shrinking and being put into smaller packages. Pin utilization becomes ever more important for low pin count devices.

Communication links typically require several signals for communication. For instance, RS232 requires at least two data signals, transmit and receive. I2C also requires two signals, a bi-directional data signal and a clock. SPI requires at least three signals, transmit, receive, and a clock. All these communication interfaces also require a common ground signal, but since that signal does not carry any information, we will ignore it in our discussions.

Communication links also require that both ends transfer data at the same rate. Some communication protocols such as I2C or SPI use a dedicated clock so both ends transfer data at the same rate. For asynchronous protocols like those used in RS232, both ends of the link must know beforehand what the transmission rate is since a dedicated clock is not used. The transmission rate of an asynchronous serial communications link is typically referred to as the baud rate.

Asynchronous protocols typically operate by using a reference clock in conjunction with a baud rate generator. Since the speed of the reference clock is known and the desired baud rate of the communication link is known, the baud rate generators can be programmed to divide the reference clock down to the baud rate.

There have been previous methods used to auto-detect the baud rate of asynchronous communication links. One prior art technique involves sending a synchronizing key stroke such as a space bar, and then measuring the duration of the first bit in the data stream. Using this time interval allows the baud rate to be set. However, the accuracy obtained by measuring just one bit may cause this detection method to fail if the baud rate is close to the speed of the reference clock.

The present invention seeks to address these issues by providing a single pin communication interface with accurate baud rate detection.

SUMMARY OF THE INVENTION

The present invention provides a single pin communication interface with automatic baud rate detection.

According to the invention, there is provided a baud rate detection circuit for determining the baud rate of a communications link using an asynchronous protocol. This baud rate detection circuit is comprised of a counter for counting the number of cycles of a reference clock of unknown frequency over a plurality of data bits, and a means for determining the number of reference clock cycles that corresponds to the baud rate of the communication link based upon the counted clock cycles. Thus, this baud rate detection circuit is comprised of a baud rate generator, a counter for counting reference clock cycles, and a means for determining the number of reference clock cycles over a plurality of data bits. It also includes means for dividing the counter value by said plurality of data bits and for adding any remainder value to the baud rate generator by adding clock cycles to the baud rate generator at various bit positions when transmitting or receiving data. The plurality of data bits may be eight bits and the dividing may comprise shifting the binary counter value three places to the right. The remainder bits from this division may be distributed over a plurality of data bits during the reception or transmission of data by adding clock cycles to the baud rate generator at strategic bit locations in order to minimize error. The circuit may have a receiver and transmitter capable of sending and receiving data using an asynchronous protocol like the one defined in the RS232 standard. The asynchronous protocol may be comprised of a start bit, a number of data bits, and one or more stop bits. The start bit may be active low and the one or more stop bits may be active high. There may be eight data bits. The counter used for baud rate detection may be configured to start when the start bit is received and count until a high bit is received. The data used for baud rate detection purposes may be 80 Hex, thereby providing a sequence of eight low bits (one low start bit combined with seven low data bits), followed by two high bits (one high data bit combined with one high stop bit). This sequence causes the counter to count over eight bits. The circuit may include a single pin communication interface which combines the transmit and receive signals of an RS-232 interface into a single signal capable of half-duplex, bi-directional communication.

Still further, according to the invention, there is provided a method of using a baud rate generator to generate a data rate based upon a measured time of a plurality of data bits by counting the number of clock cycles of a reference clock over the duration of a plurality of data bits, dividing the number of clock cycles by the number of received bits, and adding clock cycles to the baud rate generator at strategic bit positions during the transmission and reception of a data byte according to the remainder value from the dividing step. Preferably the reference clock is counted over eight bits and the counter value is divided by eight by shifting three places to the right. The three remainder bits from the shift are then preferably added to the baud rate generator during the reception and transmission of a byte at strategic bit positions in order to minimize error.

In accordance with one method and apparatus, a first character is received. During reception of this first character, the number of clock cycles of a reference clock over a duration of a number of bits of the first character is counted. The number of clock cycles is divided by the number of bits to generate a data rate quotient value and a remainder value. The first character is, for example, a particular predetermined character such as the character 80 Hex. The first character 80 Hex has a first low start bit, then seven low data bits (D0-D6), a high eighth data bit (D7), and then a following high stop bit. In this example, clock cycles of the reference clock are counted starting at the beginning of the low start bit and continuing until the beginning of the high eighth data bit. Reference clocks are therefore counted over the duration of eight bits.

The data rate quotient and remainder values are then used in the subsequent reception of a second character to determine when to sample each bit of the second character. To determine when to sample a bit of the second character, either: 1) the data rate quotient value of reference clock cycles is counted, or 2) the data rate quotient value plus one of reference clock cycles is counted. Whether the data rate quotient value of reference clock cycles is counted to determine when to sample a bit or whether the data rate quotient value plus one of reference clock cycles is counted to sample the bit depends upon the remainder value and which particular bit of the second character is to be sampled.

As set forth above in this example, the duration of eight bits in the first character is measured by counting reference clock cycles. The remainder value indicates the error across eight bits. Receiving a full character in this example comprises ten bits (one start bit, plus eight data bits, plus one stop bit). Correcting by just adding in the remainder number of clocks would be correct if only eight bits were being received. Because ten bits are being received, however, the error measured across eight bits is extrapolated across ten bits. Accordingly, the number of bits of the second character for which the data rate quotient value plus one of reference clock cycles is used to do sampling can exceed the remainder value. The bits of the second character for which the data rate quotient plus one of reference clock cycles is used are spread out across the various bits of the second character.

In the present example, reference clocks were counted across eight bits in the first character and there are ten bits in the second character to be sampled. The number of times the data rate quotient value plus one is used to sample is substantially equal to the remainder value times the number of bits in the first character across which reference clock cycles were counted, divided by the number of bits there are in the second character that are to be sampled. If, for example, the remainder value is three and the data bits of the second character are designated D0-D7, then there are three data bits (D1, D4 and D7) which are sampled by counting the data rate quotient value plus one of reference clock cycles.

The same counter may be used to both: 1) count reference clock cycles to determine the data rate quotient value, and 2) count reference clock cycles to determine when to sample a bit of the second character.

In one embodiment, the data rate quotient and remainder values are used to determine when to transmit bits of a third character. These bits of the third character may, for example, be transmitted by shifting them out of a shift register. To determine when to transmit a bit of the third character, a counter counts either: 1) the data rate quotient value plus one of reference clock cycles, or 2) the data rate quotient value of reference clock cycles. Which of the two counts is used depends on the remainder value and which particular bit it is that is to be transmitted. If, for example, the remainder value is three in this example, then there are three data bits (D1, D4 and D7) which are transmitted by counting the data rate quotient value plus one of reference clock cycles. The same counter may be used to both: 1) count reference clock cycles to determine the data rate quotient value, and 2) count reference clock cycles to determine when to transmit a bit of the third character.

Although the terms second and third are used here in connection with characters received and transmitted, these terms do not indicate a required temporal order. The third character may, for example, be transmitted before the second character is received.

Still further, according to the invention, there is provided a means for error recovery, comprising generating a break condition which has the capability of being transmitted at any time over an open drain interface.

DETAILED DESCRIPTION OF THE INVENTION

Figure 1:
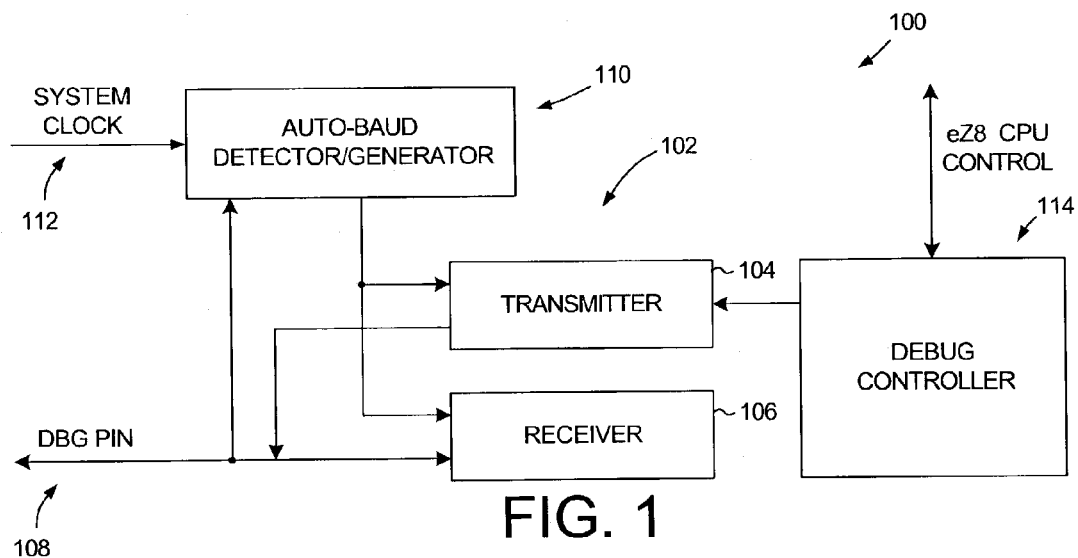
FIG. 1 is a block diagram of a circuit in accordance with the invention.

FIG. 1 shows a block diagram of a circuit 100 of the invention. The circuit includes a transmitter 104 and a receiver 106 connected to a single pin 108. The transmitter 104 and receiver 106 are controlled by a baud generator 110 which also includes a baud rate detector, and for convenience is collectively referred to as a baud rate detector/generator 110. In the present embodiment the various steps discussed further below are performed by the baud rate detector/generator 110. However, it will be appreciated that all or some of the steps could be performed by other structures.

The one-pin interface is a bi-directional, open-drain interface that transmits and receives data in half-duplex mode. Serial data is sent using the asynchronous data format defined in RS-232. Thus, minimal hardware is required to connect the single pin interface of the circuit of the invention with an RS232 link.

Figure 2:
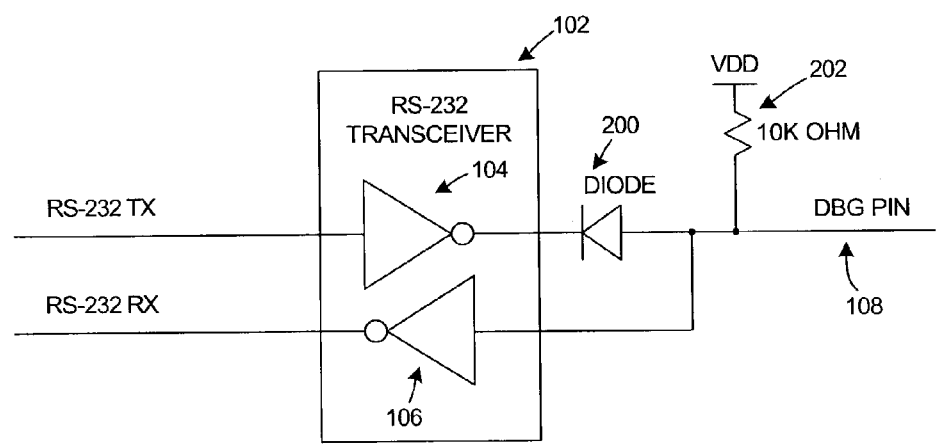
FIG. 2 is a schematic circuit diagram of a single pin interface.
Figure 3:
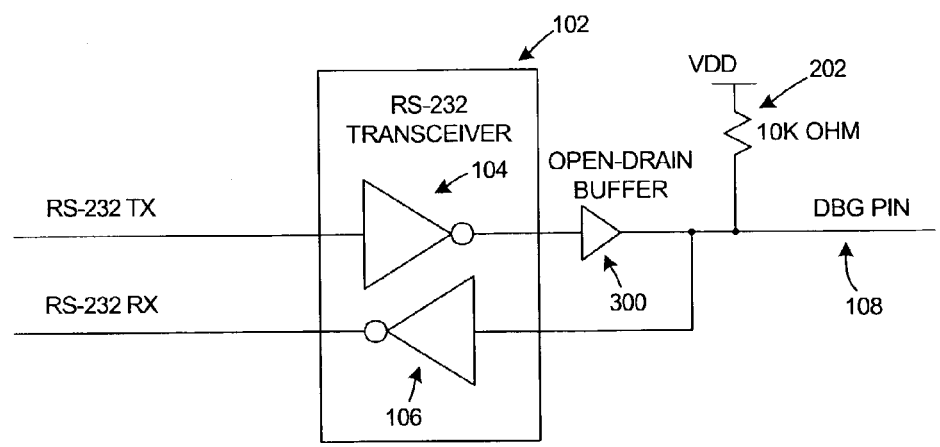
FIG. 3 is a schematic circuit diagram of another single pin interface.
Figure 4:
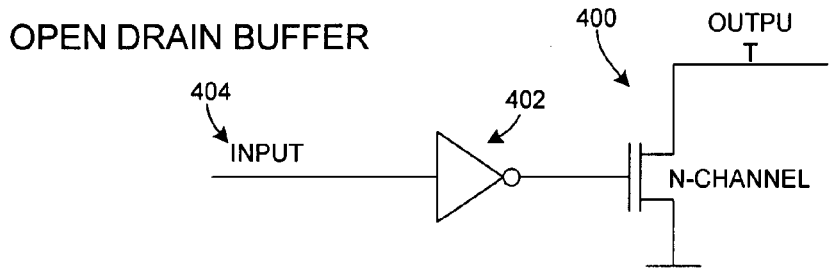
FIG. 4 is a schematic circuit diagram of a typical open drain buffer.

In order to communicate bi-directionally on the same wire, an open drain interface is used on each end of the link. A resistor is used to pull the line to a positive voltage. Each end of the link can only drive the line to ground. FIGS. 2 and 3 show two embodiments of implementations that could communicate with the single pin interface used in the invention. For convenience, the same reference numerals are used for like elements in FIGS. 2 and 3. In both cases the RS-232 transceiver 102 includes a driver 104 and receiver 106. However, in FIG. 2 the output from the driver 104 is connected to a diode 200, which ensures that the driver 104 does not drive the bi-directional link 108 with positive voltage signals. The external pull-up resistor 202 serves to pull the output line 108 up during positive voltage swings. In the FIG. 3 embodiment the output from the driver 104 is connected to an open drain buffer 300 which is depicted in greater detail in FIG. 4. As shown in FIG. 4, the open drain buffer comprises a n-channel transistor 400 connected directly to the output. Since the transistor 400 has an inverting effect, it is preceded by an inverter 402 to maintain the correct polarity. Thus, the open drain buffer 300 sinks current when a low voltage appears at the input 404, causing the output 108 to go low (it will sink all the current from the pull-up resistor 202). When a high voltage appears at the input 404, the transistor 400 switches off to avoid the driver output driving the receiver input. Thus in both embodiments the combined link 108 is connected to VDD by a pull-up resistor 202.

In order to further explain the invention in context, it will be described with reference to its implementation in Zilog's Z8 Encore.

The circuit of this embodiment 100 requires that the first character received from the host be 80 Hex. Thus, in this embodiment the present invention will configure the Baud Rate Detector/Generator 110 upon reception of the character 80 Hex. Reconfiguring the Baud Rate Detector/Generator can be done by the circuit detecting a break condition, which will reset the Baud Rate Detector/Generator. The character 80 Hex can then be resent to reconfigure the Baud Rate Detector/Generator.

As mentioned above, the circuit of the present embodiment uses the asynchronous data format defined for RS-232. Each character is transmitted in a frame comprising a start bit, eight data bits (least significant bit first) and one to two stop bits. The start bit is active low and the stop bit(s) active high. Thus the reconfiguring frame in such an implementation comprises a low start bit, followed by seven low data bits and one high data bit, and ending with one high stop bit. Thus there are eight continuous low bits before a high bit is received.

The Baud Rate Detector/Generator 110 includes a counter which counts the clock cycles of a reference clock during the transmission of the eight continuous low bits. The minimum baud rate that the system can be configured for is dependent on the length of this counter and the frequency of the reference clock.

According to the invention, the number of clock cycles counted during the reception of the eight low bits when the character 80 Hex is received is divided by eight in order to obtain the baud rate (data rate quotient value). Any remainder (remainder value) from this division is evenly distributed across characters received or transmitted by adding clocks to the baud rate generator at strategic bit locations in the character. This can be understood more clearly with reference to FIG. 5, which shows one embodiment of the baud rate detector/generator 110 of the invention. The baud rate detector/generator 110 includes a 12 bit counter 500 that holds a value corresponding to the detected baud rate, as is discussed further below. The baud rate detector is configured by enabling it for counting using Auto Baud Enable signal 504 so that it will count the number of reference clocks 502 when the receive data signal 506 is low. Thus, when the baud rate configuration character 80 Hex is received, the counter counts during the eight continuous low bits. This results in a value stored in the counter that is eight times the baud rate.

Figure 5:
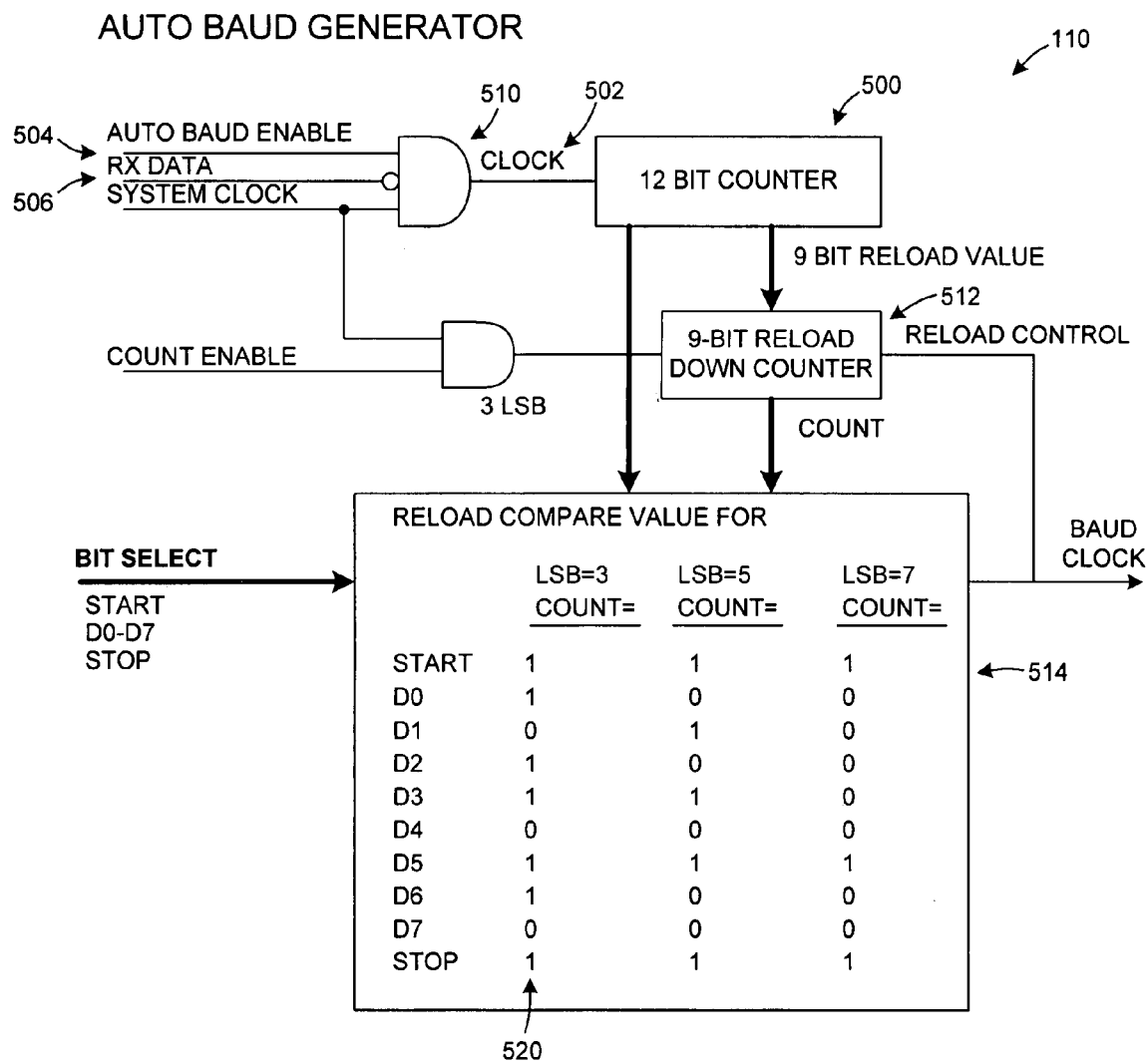
FIG. 5 is a circuit diagram of one embodiment of an auto baud generator of the invention.

A bit clock can be derived by dividing the detected count by eight, which can be done by simply shifting the binary value three places to the right. The nine most significant bits from the counter 500 are fed into a nine bit reload down counter 512. The three least significant bits in the detector counter are the remainder bits from the division. By comparing this remainder 514 with the bit position of the character currently being transmitted or received, the baud rate generator may add a clock cycle at strategic bit positions to compensate for error. FIG. 5 shows three examples of interspersing for remainder values of three, five, and seven. For example, if the remainder is three, it means that three additional clock cycles were received when the baud rate was detected across eight bits, however, three clocks do not divide evenly across eight data bits. To compensate for these extra clocks, a comparator compares the bit position with the remainder from the detected baud rate to determine when it should insert clocks, as shown in the column 520. With a remainder of three, the nine bit down counter 512 will count down one extra clock cycle when transmitting or receiving bit positions D1, D4, and D7, thereby distributing these three extra clocks over eight bit positions. Thus, for example, if during the reception of the baud rate configuration character (80Hex) the clock goes through 67 counts, the nine most significant bits define the gross number of clock cycles for transmitting eight bits, while the least significant three bits constitute the remainder which will be distributed across eight bits. Thus, in this example, 67 cycles occur for every eight bits, thereby constituting 8 cycles for each bit with 3 remaining cycles that should be distributed evenly across the eight bits.

Thus the present invention provides for a simple way of providing for baud rate detection and for providing a single pin interface. It will be appreciated that the invention can be used for automatic baud rate detection of UARTs in general and that the implementations and embodiments discussed above were by way of example only. The invention can therefore be implemented in different ways without departing from the general scope of the invention.

Furthermore, the present invention provides for a way of recovering from communication error conditions. Asynchronous protocols commonly make use of start and stop bits having opposite polarities with a predetermined number of data bits in between. For instance, in one protocol, the idle state of the communications line is the same polarity as the stop bit and the opposite polarity of the start bit. If the communications line is held in the non-idle state for more than the length of time it takes to transmit the start bit and all data bits, this is considered an error condition most commonly referred to as a break condition.

In fact, in asynchronous protocols, there are various communication error conditions that can occur. These include framing errors, parity errors, and break conditions. Due to the open drain interface of this communication link, there is also the possibility that transmit collision errors can occur. The present invention provides a means in order to notify the remote end of the link that an error occurred. This signaling is done by placing the communications line into the non-idle state for a length of time long enough to generate a break condition. Due to the open drain nature of the interface, a break condition can be sent at any time, even if the communication peripheral is currently receiving or transmitting data. The remote end of the link will then detect that a communications error occurred and can take appropriate action to attempt to recover from the error.

Although operation of certain embodiments is explained above in connection with counting either a data rate quotient number of reference clock cycles or the data rate quotient number of reference clock cycles plus one to determine when to sample a data bit or transmit a data bit, advantages of the present invention can be achieved by using other numbers of counts. For example, the number of reference clocks and the number of reference clocks minus one can be used. The difference between the two count values need not be one reference clock. For example, a number of reference clocks and the number of reference clocks plus two can be used. Three different count values can be used in the distribution of the remainder clocks over the data bits of a character.

CD Appendix: The file autobaud.v is a file of verilog hardware description language for a transmitter/receiver module in accordance with one specific embodiment of the present invention. It has an eight-bit data bus that extends to a debugger, and another eight-bit data bus that extends from the debugger. Once the module receives an entire character, it places the character on the DbgRxData bus extending to the debugger and asserts the DbgRxAck signal. When the debugger wants to transmit a character, it places the character on the DbgTxData bus and asserts the DbgTxEn signal. When the module is finished transmitting the character, the module asserts the DbgTxAck signal. The verilog file is synthesized using a synthesis tool (for example, a design compiler by the company Synopsys) resulting in a gate level netlist. The gate level netlist is used to realize an integrated circuit embodiment of the transmitter/receiver module.

It will be appreciated that the embodiments and applications discussed above were by way of example only and that other implementations and embodiments can be provided without departing from the scope of the invention.

What is claimed is:

1. A method, comprising:
    (a) receiving a first character, and counting a number of clock cycles of a reference clock over a duration of a first number of bits of the first character, the first number being a number greater than one;
    (b) dividing the number of clock cycles by the first number of bits and thereby generating a data rate quotient value and a remainder value;
    (c) receiving a second character, and counting one of: 1) the data rate quotient value of reference clock cycles, or 2) the data rate quotient value plus one of reference clock cycles, to determine when to sample a bit of the second character, the second character comprising a second number of bits; and
    (d) repeating step (c) to sample each of the bits of the second number of bits of the second character, wherein when the data rate quotient value or when the data rate quotient value plus one is used to determine when to sample is based at least in part on the remainder value.

2. A method, comprising:
    (a) receiving a first character, and counting a number of clock cycles of a reference clock over a duration of a first number of bits of the first character, the first number being a number greater than one;
    (b) dividing the number of clock cycles by the first number of bits and thereby generating a data rate quotient value and a remainder value;
    (c) receiving a second character, and counting one of: 1) the data rate quotient value of reference clock cycles, or 2) the data rate quotient value plus one of reference clock cycles, to determine when to sample a bit of the second character, the second character comprising a second number of bits; and
    (d) repeating step (c) to sample each of the bits of the second number of bits of the second character, wherein when the data rate quotient value or when the data rate quotient value plus one is used to determine when to sample is based at least in part on the remainder value, and wherein the data rate quotient value plus one is used to sample the second character a third number of times, and wherein the third number of times is substantially equal to the remainder value times the second number divided by the first number.

3. The method of claim 1, wherein a down counter is used in step (d) to determine when to sample a bit of the second character, the down counter counting down from one of: 1) the data rate quotient value, and 2) the data rate quotient value plus one.

4. The method of claim 1, wherein a counter is used in step (a) to count clock cycles of the reference clock during the receiving of the first character, and wherein the counter is used in step (c) to determine when to sample each successive bit of the second character.

5. The method of claim 1, wherein the first number is equal to the second number.

6. The method of claim 1, wherein the second number is greater than the first number.

7. A method, comprising:
    (a) receiving a first character, and counting a number of clock cycles of a reference clock over a duration of a first number of bits of the first character, the first number being a number greater than one;
    (b) dividing the number of clock cycles by the first number of bits and thereby generating a data rate quotient value and a remainder value;
    (c) receiving a second character, and counting one of: 1) the data rate quotient value of reference clock cycles, or 2) the data rate quotient value plus one of reference clock cycles, to determine when to sample a bit of the second character, the second character comprising a second number of bits;
    (d) repeating step (c) to sample each of the bits of the second number of bits of the second character, wherein when the data rate quotient value or when the data rate quotient value plus one is used to determine when to sample is based at least in part on the remainder value;
    (e) transmitting a third character that comprises a plurality of bits, and counting one of: 1) the data rate quotient value of reference clock cycles, or 2) the data rate quotient value plus one of reference clock cycles to determine when to transmit a bit of the third character; and
    (f) repeating step (e) to transmit each of the bits of the plurality of bits of the third character, wherein when the data rate quotient value or when the data rate quotient value plus one is used to determine when to transmit is based at least in part on the remainder value.

8. The method of claim 7, wherein steps (e) and (f) occur before steps (c) and (d).

9. The method of claim 7, wherein steps (e) and (f) occur after steps (c) and (d).

10. An autobaud circuit that receives a first character and a second character, comprising:
    a counter that counts a number of clock cycles of a reference clock over a duration of a first number of bits of the first character, the first number being a number greater than one, wherein the number of clock cycles divided by the first number of bits results in a data rate quotient value and a remainder value; and means for determining when to sample each one of a plurality of bits of the second character based at least in part on the remainder value.

11. An autobaud circuit that receives a first character and a second character, comprising:

a counter that counts a number of clock cycles of a reference clock over a duration of a first number of bits of the first character, the first number being a number greater than one, wherein the number of clock cycles divided by the first number of bits results in a data rate quotient value and a remainder value; and means for determining when to sample each one of a plurality of bits of the second character based at least in part on the remainder value, wherein a duration of the data rate quotient value of reference clock cycles occurs between a time when a first bit of the second character is sampled and a time when a second bit of the second character is sampled, and wherein a duration of the data rate quotient value plus one of reference clock cycles occurs between a time when a third bit of the second character is sampled and a time when a fourth bit of the second character is sampled.

12. A method, comprising:
(a) receiving a first character having a plural number of bits;
(b) counting a number of clock cycles of a reference clock over a duration of the plural number of bits;
(c) dividing the counted number of clock cycles by the plural number of bits and thereby generating a data rate quotient value and a remainder value;
(d) receiving a second character having a bit; and
(e) determining when to sample the bit of the second character using the data rate quotient value.

13. The method of claim 12, wherein the second character has a second bit, further comprising:
(f) determining, based at least in part on the remainder value, that the second bit of the second character is to be sampled using a data rate quotient value plus one; and
(g) determining when to sample the second bit of the second character using the data rate quotient value plus one.

14. The method of claim 12, wherein the second character has a second bit, further comprising:
(f) determining, based at least in part on the remainder value, that the second bit of the second character is to be sampled using a data rate quotient value plus one; and
(g) determining when to sample the second bit of the second character using the data rate quotient value plus one, wherein the number of clock cycles of the reference clock is counted in (b) over a duration of eight bits of the first character, and wherein the counted number of clock cycles is divided in (c) by shifting a counter value three places to the right.

15. The method of claim 14, wherein the first character has ten bits, and wherein the data rate quotient value generated by dividing the counted number of clock cycles by eight bits is extrapolated across ten bits.

16. The method of claim 12, further comprising:
(f) detecting a break condition in which all bits of the second character are determined to be in a non-idle state.

17. The method of claim 12, further comprising:
(f) sampling the bit of the second character to generate a sample; and
(g) outputting the sample.

18. The method of claim 12, further comprising:
(f) providing a baud clock based on the data rate quotient value and the remainder value.

19. The method of claim 12, further comprising:
(f) determining a baud rate based on the data rate quotient value; and
(g) approximately evenly distributing the remainder value number of clock cycles over a number of cycles of a baud rate clock counted for a plurality of received or transmitted bits.

20. The method of claim 12, wherein the first character is 80 Hex.

* * * * *